United States Patent [19]

Kobayashi

[11] Patent Number: 4,723,299
[45] Date of Patent: Feb. 2, 1988

[54] NOISE ELIMINATING CIRCUIT FOR A GRAPHICAL INPUT TERMINAL

[75] Inventor: Tadashi Kobayashi, Tokyo, Japan

[73] Assignee: NEC Corporation, Japan

[21] Appl. No.: 648,653

[22] Filed: Sep. 6, 1984

[30] Foreign Application Priority Data

Sep. 16, 1983 [JP] Japan .................. 58-170741

[51] Int. Cl.⁴ .............................................. G06K 9/22
[52] U.S. Cl. ......................................... 382/59; 178/18; 333/172; 307/263; 307/268; 307/556; 307/601
[58] Field of Search ............... 382/3, 13, 59; 178/18, 178/19; 333/167, 172; 307/263, 268, 601, 556, 243, 246

[56] References Cited

U.S. PATENT DOCUMENTS

| | | | |
|---|---|---|---|
| 3,573,484 | 4/1971 | Engroff | 307/246 |
| 3,959,585 | 5/1976 | Mattes et al. | 178/18 |
| 3,969,678 | 7/1976 | Asahara et al. | 333/172 |
| 4,205,199 | 5/1980 | Mochizuki | 178/18 |
| 4,465,981 | 8/1984 | Pike | 330/281 |
| 4,542,526 | 9/1985 | Satoh et al. | 382/59 |

Primary Examiner—Leo H. Boudreau
Assistant Examiner—Jose L. Couso
Attorney, Agent, or Firm—Laff, Whitesel, Conte & Saret

[57] ABSTRACT

A noise eliminating circuit is provided for a graphical input terminal having an input unit which generates electrical signals when a stylus is used to write on a surface of the unit. The electrical signals correspond to information written on the surface. Further, an envelope signal is generated responsive to the starting of the writing, which continues throughout the writing, and ends at the time when the writing stops on the surface. A low-pass filter responds to the electrical signals representing the written message to remove high frequency noise therefrom. A switch selects either the electrical signals or the output of the low-pass filter as the output signal to the noise eliminating circuit. The switch is operated in response to the envelope signal specifying the starting and stopping times.

4 Claims, 12 Drawing Figures

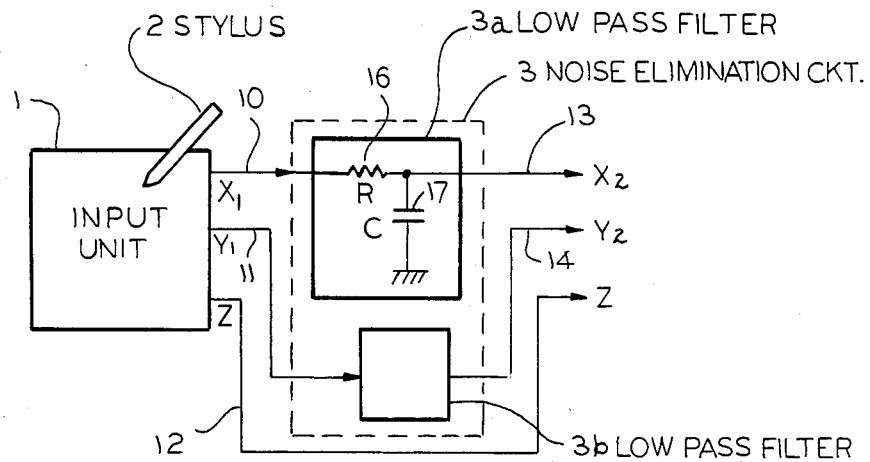
FIG.1
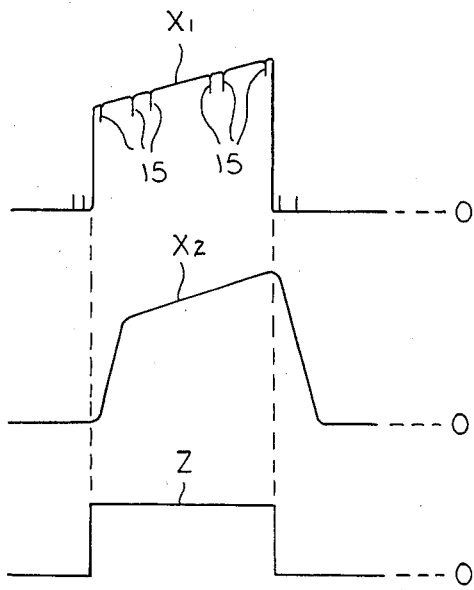
FIG.2A
FIG.2B
FIG.2C

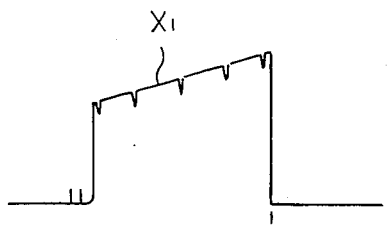
FIG.5A
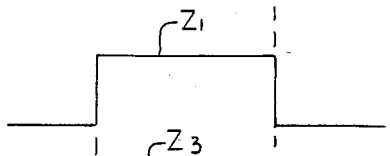
FIG.5B
FIG.5C
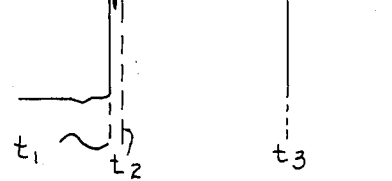
FIG.5D
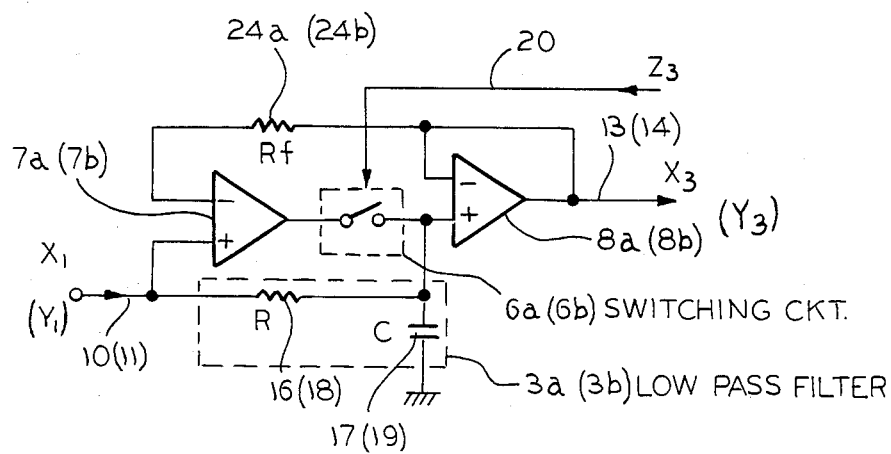
FIG.6

NOISE ELIMINATING CIRCUIT FOR A GRAPHICAL INPUT TERMINAL

BACKGROUND OF THE INVENTION

The invention relates to a noise eliminating circuit for a graphical input terminal and, more particularly, to a noise eliminating circuit suited to eliminate impulsive noises superimposed on coordinate signals, or the like.

A conventional graphical input terminal, which is described in U.S. Pat. No. 3,959,585, generates an electrical indication which is representative of the position of a stylus as it is hand-operated on an input surface. However, in this terminal, fine impulsive noise is generated due to irregular fluctuations in writing pressure on the input surface. These noises are superimposed on the electrical indication, thereby impairing an accurate detection of the position of the stylus on the surface.

In order to obviate such a disadvantage, another input terminal has been described to eliminate such noises. For this purpose, this terminal is equipped with an additional noise eliminating circuit, which includes a low-pass filter having a resistor and a capacitor. However, with this terminal, an accurate detection of the position of the stylus cannot be attained during a period of time immediately after a stylus-moving or a writing operation has started, as described in detail hereinafter.

One object of this invention is, therefore, to provide a noise eliminating circuit for a graphical input terminal which is free from above-mentioned disadvantages in the prior art terminals.

According to one aspect of the present invention, there is provided a noise eliminating circuit for a graphical input terminal having an input unit. The input unit generates an electrical indication corresponding to information represented on the input surface thereof by a hand-operated stylus and further generates a signal including information specifying the starting time of a writing operation on the surface. The terminal further comprises: low-pass filter means responsive to the indication; switch means for selecting as an output signal to the noise eliminating circuit either one of the indication or the output signal from the low-pass filter means; and control means responsive to the signal including the starting time information to control the switch means for selecting the indication for a predetermined duration of time after the starting time.

BRIEF DESCRIPTION OF THE DRAWINGS

The features and advantages of the present invention will become apparent from the following description when taken in conjunction with the accompanying drawings in which:

FIG. 1 is a block diagram of a conventional graphical input terminal;

FIGS. 2A through 2C are diagrams of waveforms for describing the operation of the terminal of FIG. 1;

FIGS. 5A through 5D are diagrams of waveforms for describing the operation of the first embodiment;

FIG. 6 is a block diagram of a second embodiment of the invention; and

FIG. 7 is a circuit diagram showing a timing port of the control means.

In the drawings, the same reference numerals denote the same structural elements.

DETAILED DESCRIPTION OF THE PREFERRED EMBODIMENTS

Figure 3:
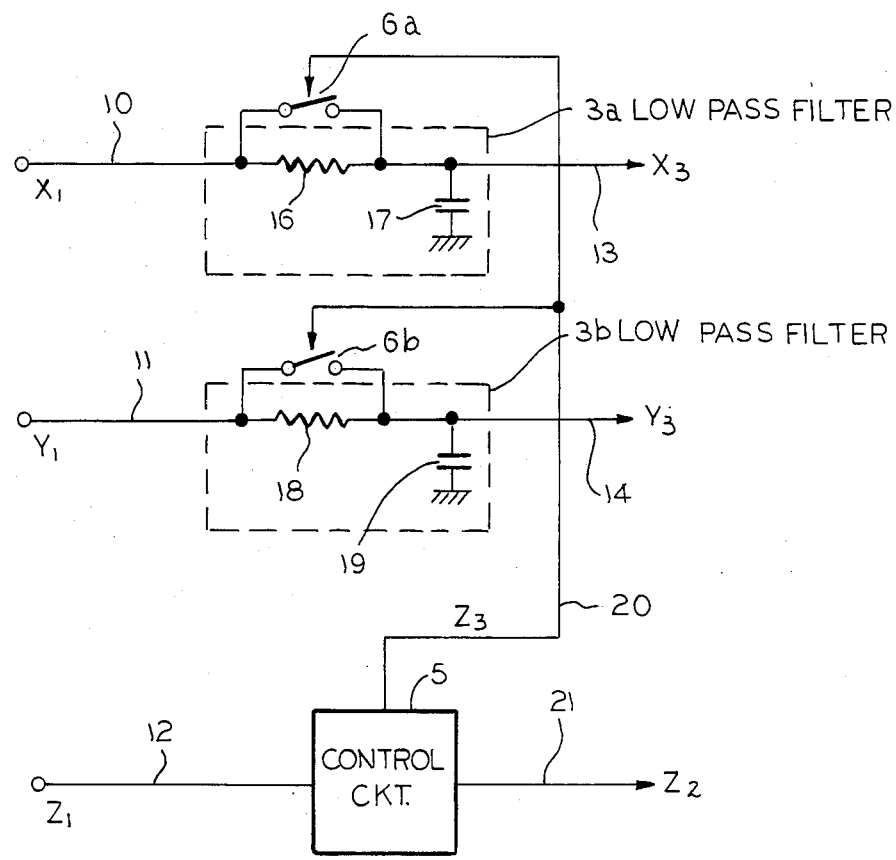
FIG. 3 is a block diagram of a first embodiment of the invention.

Referring to FIG. 1, the above-mentioned conventional graphical input terminal comprises an input unit 1 having an input surface. Every point on the surface is uniquely defined by X and Y coordinates along X and Y axes which are orthogonal to each other. The terminal outputs an electrical indication consisting of coordinate signals $X_1$ and $Y_1$ respectively corresponding to the X and Y coordinates to specify the position of a stylus 2 on the input surface to signal lines 10 and 11. The circuit also outputs a pulse Z or signal like 12 for indicating the presence of the writing operation, while the writing operation is being performed. The input terminal further includes a noise eliminating circuit 3 having a low-pass filter 3a, which consists of a resistor 16 and capacitor 17, to produce a signal $X_2$ on a signal line 13 in response to the signal $X_1$. The circuit 3 further includes a low-pass filter 3b, which consists of a resistor and capacitor (not shown), to produce a signal $Y_2$ on a signal line 14 in response to the signal $Y_1$.

Upon contacting a position on the input surface by the stylus 2, the unit 1 produces the signal $X_1$ (FIG. 2A) and $Y_1$ (not shown) in analog voltages proportional respectively to the X and Y coordinates representative of the position of the stylus 2 on the input surface. Signals $X_1$, $Y_1$, are applied to the lines 10 and 11, and pulses (FIG. 2C) are applied to the line 12 only while such contact (writing) is made by the stylus on the input surface. As shown in FIG. 2A, at such a time, noise pulses 15 appear in the form of fine pulses which are caused on the signals $X_1$ and $Y_1$ due to irregular fluctuations in contact pressure by the stylus bearing against the input surface. The filters 3a and 3b eliminate the noise 15 from the signals $X_1$ and $Y_1$ to produce noise-eliminated signals to the lines 13 and 14, as signals $X_2$ (FIG. 2B) and $Y_2$, respectively.

The terminal continuously detects the X and Y coordinates of the contact positions of the stylus 2 and gives signals responsive thereto in the form of analog voltages $X_2$ and $Y_2$. The pulse Z indicates the presence of the stylus in contact with the writing surface and is produced on the line 12.

In order to enhance the precision in the detection of respective coordinates, the circuit 3 must exhibit a sufficient attenuation in the higher frequency band covering the frequencies in which the noise signals 15 are included. For this purpose, it is necessary to set the product of the values of the resistor 16 and the capacitor 17 (i.e., the time constant) at a large value. Or, alternately, it is necessary to increase the number of the resistors and the capacitors to improve the filte's order. However, this will unavoidably entail an increase in the amount of the phase lag in the noise eliminating circuit 3 which, in turn, increases the rising time and the falling time of the voltages of the signals $X_2$ and $Y_2$. Since the terminal detects the signals $X_2$ and $Y_2$ as coordinate value information, an accurate detection of coordinates becomes impossible at or close to the leading edge of the pulse Z, because the voltages of the signals $X_2$ and $Y_2$ rise very slowly as shown in FIG. 2B.

Referring to FIG. 3, a first embodiment of the invention comprises: a low-pass filter 3a including a resistor 16 and a capacitor 17, to produce a signal $X_3$ to the line 13 in response to a coordinate signal $X_1$ which is given from the input unit 1 (FIG. 1); a low-pass filter 3b having a resistor 18 and a capacitor 19, to produce a signal $Y_3$ to the line 14 in response to a coordinate signal $Y_1$ from the unit 1; switch circuits 6a and 6b respectively connected between both ends of resistors 16 and 18; and a control circuit 5 for producing a pulse $Z_2$ on a signal line 21 in response to a pulse $Z_1$ which is fed from the input unit 1 via the line 12. Control circuit 5 also produces a pulse $Z_3$ on a signal line 20 in response to the pulse $Z_1$. The switch circuits 6a and 6b are composed of transistor switches or analog switches which are open only while pulses are supplied from the circuit 5 via the signal line 20, and are closed at other times.

Figure 4:
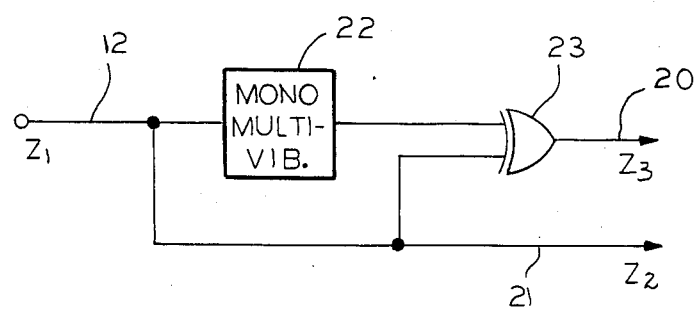
FIG. 4 is a circuit diagram illustrating a part of the embodiment of FIG. 3.

Referring to FIG. 4, the circuit 5 which is used in this embodiment, comprises a monostable multivibrator 22 which is triggered by the leading edge of the pulse $Z_1$ fed on the line 12 to produce a pulse for a predetermined delay time d. An exclusive OR gate 23 performs the exclusive OR operation between the output from the multivibrator 22 and the signal fed on the line 12 to produce the operation result to the line 20.

Referring to FIGS. 3 and 5A through 5D, the operation of the embodiment will be described.

As soon as the stylus-moving operation on the input surface of the unit 1 (FIG. 1) starts at the time $t_1$ (FIG. 5), the pulse $Z_1$ (FIG. 5B) rises to indicate the presence of the writing operation on the input surface. Simultaneously, a voltage of the signal $X_1$ (FIG. 5A) rises abruptly to the value corresponding to the X coordinate of the position of the stylus on the surface. Subsequently, until the time when the writing operation ends at the time $t_3$, the voltage of the signal $X_1$ will change in proportion to the changes in the position of the stylus 2. The pulse $Z_3$ is supplied from the circuit 5 (FIG. 5C) and rises at the time $t_2$, which is delayed from the time point $t_1$ corresponding to the leading edge of the pulse $Z_1$. The delay time is shown by d. Pulse $Z_3$ falls at the time $t_3$ corresponding to the trailing edge of the pulse $Z_1$.

Since the circuit 6a is closed before the time $t_2$, both ends of the resistor 16 are short-circuited before the time $t_2$. Therefore, when the voltage of the signal $X_1$ rises at the time $t_1$, its voltage is applied directly to both sides of the capacitor 17, which, in turn, makes the voltage of the signal $X_3$ (FIG. 5D) rise instantaneously to the same value as the voltage of the signal $X_1$. Since the circuit 6 is open between the time points $t_2$ and $t_3$, the signal $X_1$ passes through the filter 3a, thereby suppressing any noise components included therein.

When the pulse $Z_3$ falls at the time $t_3$, the circuit 6 is closed again to once more short-circuit both ends of the resistor 16. As a result, an electric discharge will occur in the capacitor 17 via the generating means (not shown) of the signal $X_1$. This generator means has a low output-impedance and is provided inside the input unit 1. The discharge of capacitor 17 makes the voltage of the signal $X_3$ fall instantaneously.

This operation may be compared to the prior art operation which occurs when both ends of the resistor 16 are not short-circuited as often. The rising and falling times of the voltage of the signal $X_3$ is remarkably shortened when resistor 16 is short-circuited. In other words, the signal $X_3$ generated by this embodiment does not include noise components. Also, the signal $X_3$ can follow the signal $X_1$ at fast speeds and at the leading edge of the voltage. Although, the signals $X_1$ and $X_3$ corresponding to the X coordinate alone are explained in the foregoing specification, the same principles can be applied to the signals $Y_1$ and $Y_3$ corresponding to the Y coordinate.

If the rising time of the pulse $Z_1$ is almost equal to the delay time d, an operation similar to the one achieved in this embodiment may be attained by using a switch circuit 6 which is driven by the pulse $Z_1$ much as the pulse $Z_3$ drives switch 6 in this embodiment. Then, circuit 6 is switched to open at the end of the rising time of the pulse $Z_3$, without employing the control circuit 5.

A similar effect may also be achieved by constructing a control circuit 5 with a first monostable multivibrator triggered by the leading edge of the pulse $Z_1$, a second monostable multivibrator triggered by the leading edge of the pulse $Z_1$, a second monostable multivibrator triggered by the trailing edge of the pulse $Z_1$, and a gate circuit for performing the OR operation between the outputs from these multivibrators. The resulting operation controls the open/closing operation of the switch circuits 6a and 6b.

The low-pass filter may be composed of active filters, switched capacitor filters, etc.

Referring to FIG. 6, a second embodiment comprises: the low-pass filter 3a (3b) including a resistor 16 (18) which is given coordinate signal $X_1$ ($Y_1$) via the signal line 10 (11) and the capacitor 17 (19); an operational amplifier 8a (8b) having a non-inverting input terminal given the output of the filter 3a (3b) and an inverting input terminal given the output of the amplifier 8a (8b); an operational amplifier 7a (7b) having a non-inverting input terminal given the coordinate signal $X_1$ ($Y_1$) and an inverting input terminal given the output of the amplifier 8a (8b) via a resistor 24a (24b); and the switch circuit 6a (6b) which is connected between an output terminal of the amplifier 7a (7b) and the non-inverting input terminal of the amplifier 8a (8b).

The circuit 6a (6b) is controlled responsive to the output of the circuit 5 (shown in FIG. 4) for the open/closing operation in a manner which is similar to the first embodiment. When the circuit 6a (6b) is closed, a voltage signal which is identical to the voltage of the signal $X_1$ ($Y_1$) is sent from the amplifier 7a (7b) to the amplifier 8a (8b). This makes the voltage across the capacitor 17 (19) identical to the signal $X_1$ ($Y_1$). In response to the operating of the circuit 6a (6b), the signal $X_1$ ($Y_1$) is sent through the filter 3a (3b) to the amplifier 8a (8b). In this manner, the embodiment can perform an operation which is equivalent to the first embodiment. Thus, the X and Y coordinates can be accurately detected from the signals $X_3$ and $Y_3$.

FIG. 7 shows part of the control means which includes a first monostable multivibrator 24 which is triggered by a signal Z1, which includes time-specifying information which occurs at the starting time. The first multivibrator 24 produces a pulse for a first predetermined duration of time. A second monostable multivibrator 25 is also triggered by the signal Z1, which includes the time-specifying information which occurs at the terminating time. The second multivibrator 25 produces a pulse for the second predetermined duration of time. The outputs of these two multivibrators pass through OR gate 26, as output signal Z3. The signal at 12 passes directly to output 21 as signal Z2.

Those who are skilled in the art will readily perceive how to modify the invention. Therefore, the appended claims are to be construed to cover all equivalent structures which fall within the true scope and spirit of the invention.

I claim:

1. A noise eliminating circuit for a graphical input terminal having input means including a hand-operated stylus to write on an input surface, said input means generating an electrical indication corresponding to information written on said input surface by said hand-operated stylus, said input means also generating a first signal including information specifying at least a starting time of a writing operation on said surface, said noise eliminating circuit comprising: low-pass filter means coupled to receive said electrical indication; switch means for selecting either said electrical indication or the output signal from said low-pass filter means as an output signal of said noise eliminating circuit; control means which is responsive to the first signal including said starting time-specifying information to control said switch means for continuing said selection for a predetermined duration of time after said starting time; and means for changing said signal including the time-specifying information to a predetermined level only during the writing operation.

2. A noise eliminating circuit for a graphical input terminal as claimed in claim 1, in which said control means includes a monostable multivibrator triggered by said signal including said time-specifying information at said starting time to produce a pulse for said predetermined duration of time, and means including an exclusive OR gate circuit operating between said signal including said time point-specifying information and the output of said monostable multivibrator.

3. A noise eliminating circuit for a graphical input terminal as claimed in claim 1, in which said control means includes a first monostable multivibrator triggered by said signal including said time-specifying information at said starting time, said first multivibrator producing an output pulse for a first predetermined duration of time, said signal from said input means also indicating a terminating time of said writing operation, and a second monostable multivibrator triggered by said signal including said terminating time of said writing operation, said second multivibrator producing an output pulse for a second predetermined duration of time.

4. A noise eliminating circuit for a graphical input terminal having input means including a hand-operated stylus to write on an input surface, said input terminal giving a first signal which includes information specifying at least a starting time of a writing operation and thereafter continues as long as said stylus engages said surface so that said given first signal includes both said starting time-specifying information and also the terminating time of said writing operation, said stylus generating an electrical indication corresponding to information written on said input surface by said hand-operated stylus, said noise eliminating circuit comprising: low-pass filter means coupled to receive said electrical indication and to give an output signal; switch means for selecting either said electrical indication or the output signal from said low-pass filter means as an output signal of said noise eliminating circuit; control means which is responsive to the first signal including said starting time-specifying information to control said switch means for continuing said selection for a predetermined duration of time after said starting time; said control means being operated responsive to said given first signal including said starting time-specifying information to select said indication for a first predetermined duration of time after said starting time and a second predetermined duration of time after said terminating time; said control means further including a first monostable multivibrator triggered by said signal including said time-specifying information at said starting time, said first multivibrator producing a pulse for said first predetermined duration of time, and a second monostable multivibrator triggered by said signal including the time-specifying information at said terminating time, said second multivibrator producing a pulse for said second predetermined duration of time.

* * * * *